United States Patent [19]
Pierson

[11] Patent Number: 5,482,623
[45] Date of Patent: Jan. 9, 1996

[54] FILTER PRESS APPARATUS

[75] Inventor: Henri G. W. Pierson, Canary Islands, Spain

[73] Assignee: D & C Limited, Liberia

[21] Appl. No.: 230,744

[22] Filed: Apr. 21, 1994

[30] Foreign Application Priority Data

Oct. 25, 1993 [GB] United Kingdom .................. 9321972

[51] Int. Cl.⁶ ........................... B01D 29/41; B01D 29/82; B01D 29/96
[52] U.S. Cl. .................... 210/236; 210/346; 210/351; 210/450; 210/456; 100/197; 100/211
[58] Field of Search ...................... 210/224, 225, 210/230, 236, 350, 450, 770, 330, 331, 334, 346, 351, 456; 100/197–199, 211

[56] References Cited

U.S. PATENT DOCUMENTS

| 4,607,570 | 8/1986 | Hauser | 100/211 |
| 5,094,760 | 3/1992 | Bratten | 210/770 |

FOREIGN PATENT DOCUMENTS

| 49910 | 11/1965 | Poland | 210/225 |
| 907485 | 10/1962 | United Kingdom . | |

Primary Examiner—Matthew O. Savage

[57] ABSTRACT

A plurality of substantially parallel filter plates are assembled as a unit and are locatable within a substantially rigid outer shell to provide a closed vessel. Either or both of the unit and the shell are movable relative to the other between a position wherein the unit is sealed within the shell to enable pressurised supply to the shell of medium to be filtered via the plates and a position wherein the unit is at least partially removed from the shell to enable discharge of resultant filter cake from the plates. To improve filter efficiency, reducing the number of plates required and the pressure required, and to allow the removal of the filter plate unit when encrusted with filter cake, substantially impermeable, flexible membrane is provided as a lining to the shell and an additional shell inlet/outlet port is provided and is connected to pressure medium supply means so that a space between the lining and the shell is inflatable by pressure medium for the duration of the filtration operation. Adjacent filter plates of the unit are separated by spacer means of elastomeric material, and the filter plates and the intervening spacer means are slidably mounted on bearers with mechanical means provided for releasably pressing the plates and the spacer means together. In this way additional cake compression can be achieved as well as easy release of dry cake at the end of each cycle.

10 Claims, 7 Drawing Sheets

FILTER PRESS APPARATUS

TECHNICAL FIELD

This invention concerns filter press apparatus, more specifically of the type comprising a plurality of substantially parallel filter plates, assembled as a unit and locatable within a substantially rigid outer shell to provide a closed vessel, either or both of said unit and said shell being movable relative to the other between a position wherein the unit is sealed within the shell to enable pressurised supply to the shell of medium to be filtered via the plates and a position wherein the unit is at least partially removed from the shell to enable discharge of resultant filter cake from the plates.

BACKGROUND ART

Traditional filter presses consist of a series of filter plates, each covered by filter cloth, supported in substantially parallel relationship on bearers and pressed together by mechanical means, such as a movable head and a screw spindle. Spaces are formed between adjacent plates due to raised rims around their edges, or by insertion of spacers in the form of hollow frames. These spacers are sealed tight by mechanical pressure during operation and then filled with suspension to be filtered, the filtrate being forced through the cloth, and via grooves in the plate to an outlet. Generally, there is a tendency to produce thick filter cake with such apparatus, e.g. 12 mm on each plate face, in order to increase the yield per cycle. However, this reduces efficiency as resistance to draining increases exponentially with cake thickness, and high pressures are therefore required. Additionally, cake discharge necessitates manual intervention, such as the pushing apart of plates followed by hosing down or scraping, and it is often problematic.

A development from the traditional filter press has been use of a closed pressure vessel, as outlined in the first paragraph above. One form of such apparatus is known as a Kelly filter and it has the unit of filter plates mounted on a carriage for movement in and out of the outer shell or vessel. Again, care discharge is problematic. Dry filter cakes cannot practically be produced since they would compact the entire filter plate unit and caused it to be damaged upon removal from the shell as well as being very difficult to remove.

OBJECTS OF THE INVENTION

The object of the present invention is to design improved filter press apparatus which allows pressure filtration in an enclosed system at a higher efficiency than hitherto possible. Additional aims are to make practical fully automatic care discharge and to allow good cake washing if required.

SUMMARY OF THE INVENTION

According to the invention, improved efficiency is achieved making a start from apparatus as set forth in the first paragraph hereto in that a substantially impermeable, flexible membrane is provided as a lining to the shell and an additional shell inlet/outlet port is provided and is connected to pressure medium supply means whereby a space between said lining and the shell is inflatable by said pressure medium for the duration of the filtration operation.

When using this apparatus, the space behind the impermeable flexible membrane is inflated, for example by water or oil, so that during filtration said membrane presents an incompressible wall adjacent which the back pressure of the medium to be filtered can work to produce the filtration draining force, until such time as dry filter cakes are produced. On evacuating the space behind the membrane sufficient room becomes available for the unit of filter plates (often referred to as "a pack") to be withdrawn so that hard, dry filter cakes can be produced without likelihood of damage to the plates upon withdrawal.

ADDITIONAL PRIOR ART

Another type of filter apparatus is known, for example as disclosed in GB 907,485, wherein a tubular filter element is surrounded by an impervious elastic sleeve, disposed with a housing, with slurry to be filtered being introduced between the element and the sleeve and pressurised liquid being introduced between the sleeve and the housing to force the sleeve against the slurry and bring about filtration of the slurry via the element. Such apparatus has numerous disadvantages, in particular the extreme difficulty of washing and of removal of resultant filter cake adhering to the filter element, even when the said element is axially removable from the housing and the sleeve. Moreover, the efficiency is low owing to the small area of the filter element and variable cake thickness. In any event, it will be appreciated that the manner of achieving filtration differs significantly from that of the present invention, where the liner itself is not used to squeeze liquor from the slurry, but merely to close the periphery of the spaces between the plates. In this respect, in the present proposal, the flexible membrane could even be replaced by a length of coiled sheet metal which would be tightened around the plate pack during filtration and subsequently relaxed for extraction of the pack, although this might not be so easy to put into practice as use of an inflatable membrane.

FURTHER INVENTIVE FEATURES

In further significant developments of the present invention, it is proposed that the filter plates of the pack be separated by spacer means of elastomeric material, and that, in similar manner to the traditional non-enclosed filter presses, the filter plates and the intervening spacer means be slidably mounted on bearers with mechanical means provided for releasably pressing the plates and the spacer means together.

In this way, firstly, the filtration efficiency can be enhanced by virtue of the added mechanical pressure. More importantly, however, because the plates are packed together via elastomeric spacers, the spaces between plates open up as soon as the mechanical pressure is released at the end of the filtration cycle. The cake therefore tends to drop out unaided, or can readily be scraped out e.g. by a rake.

As regards cake washing, a further development is proposed. As is fairly conventional in the field of filter presses, the filter plates of the pack will have intersecting drainage grooves in both major surfaces. It is additionally proposed that the grooves on one surface drain to a first channel which runs through the pack, while the grooves on the other surface drain to a second channel which runs through the pack. When washing is required, wash liquor fed through the first channel has to work its way, via the grooves on one major surface, and the filter cloth, if present, and via the filter cake between adjacent plates to the grooves in the other (facing) major surface of the adjacent plate and then out via its grooves to the second channel. A good displacement wash is therefore ensured and the back wash effect should also effect a degree of filter medium washing, e.g. filter cloth washing, if cloth is present.

BRIEF DESCRIPTION OF DRAWINGS

A specific embodiment of a filter press of the invention, along with some variant types of filter plate, will now be described, by way of example only, with reference to the accompanying drawings in which.

DETAILED DESCRIPTION OF ILLUSTRATED EMBODIMENT

Figure 1:
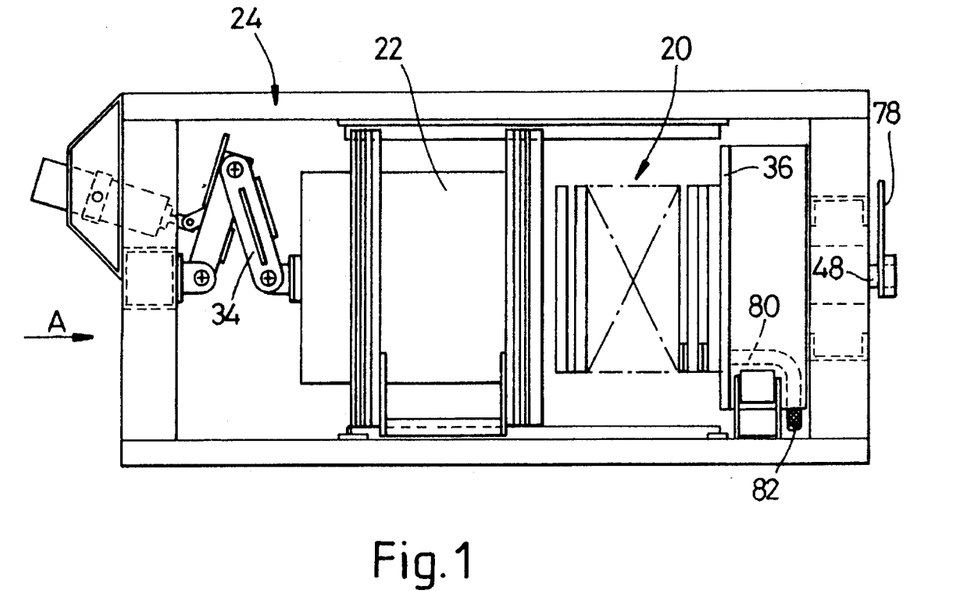
FIG. 1 is a schematic view showing the main components of the exemplary embodiment of apparatus.

Referring firstly to FIG. 1, the apparatus comprises a filter plate pack assembly 20 (FIG. 4) and an outer shell 22 mounted on a support frame 24.

Figure 2:
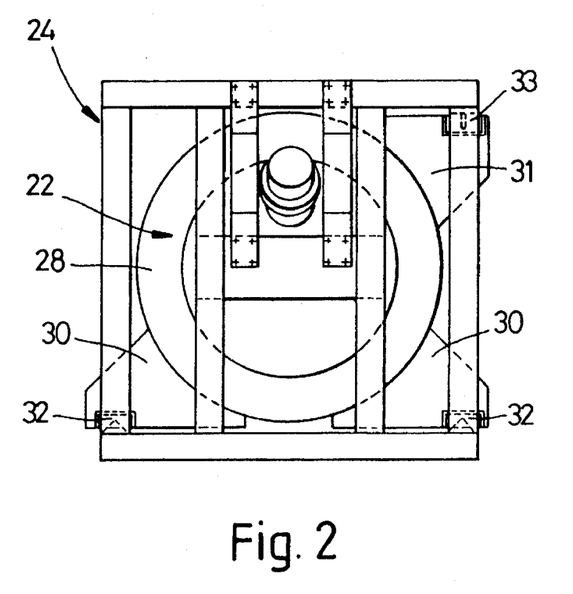
FIG. 2 is an end view in the direction of arrow A in FIG. 1.
Figure 3:
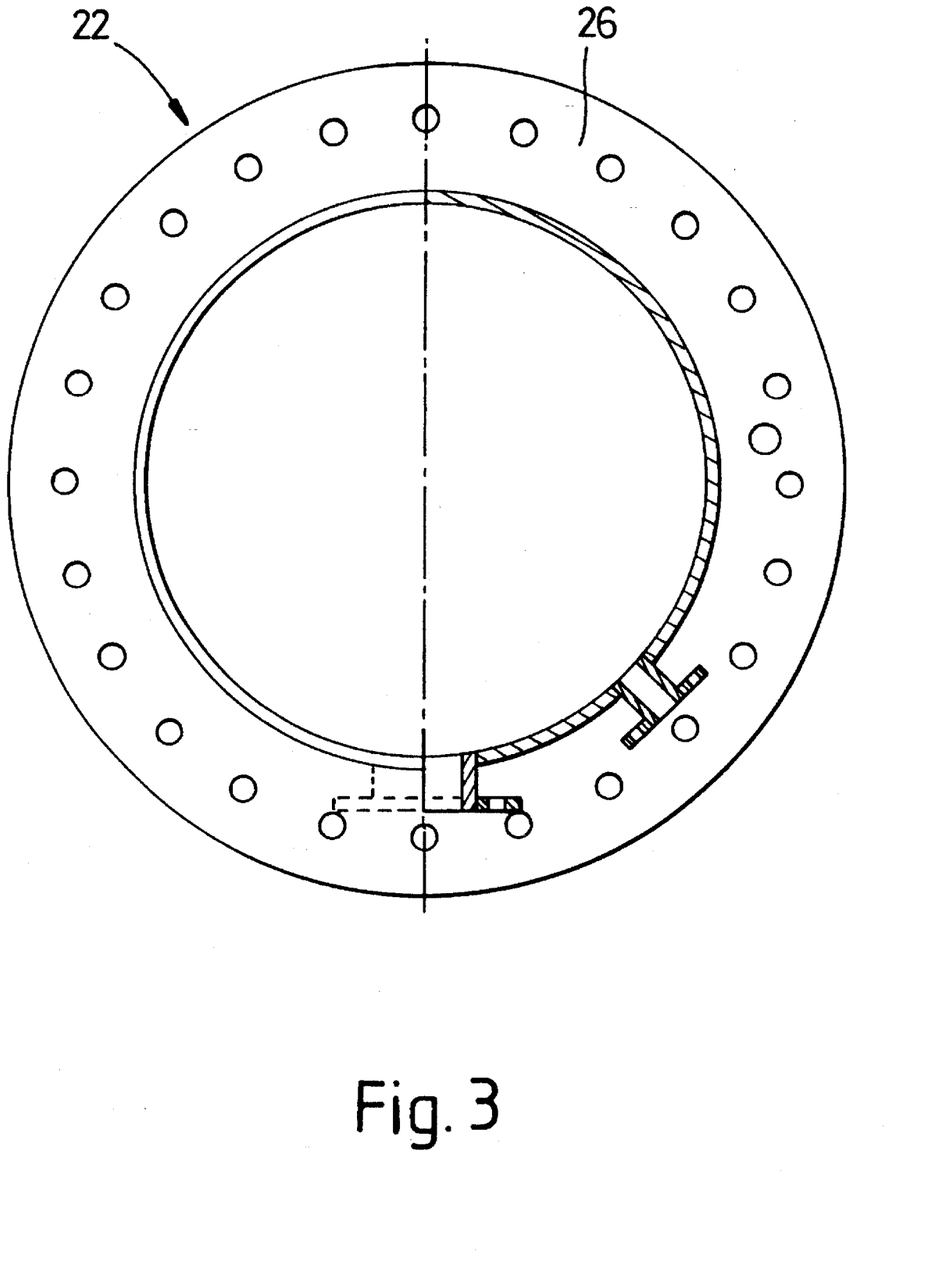
FIG. 3 is an enlarged view of the shell, half as end view, half as transverse cross section.
Figure 12:
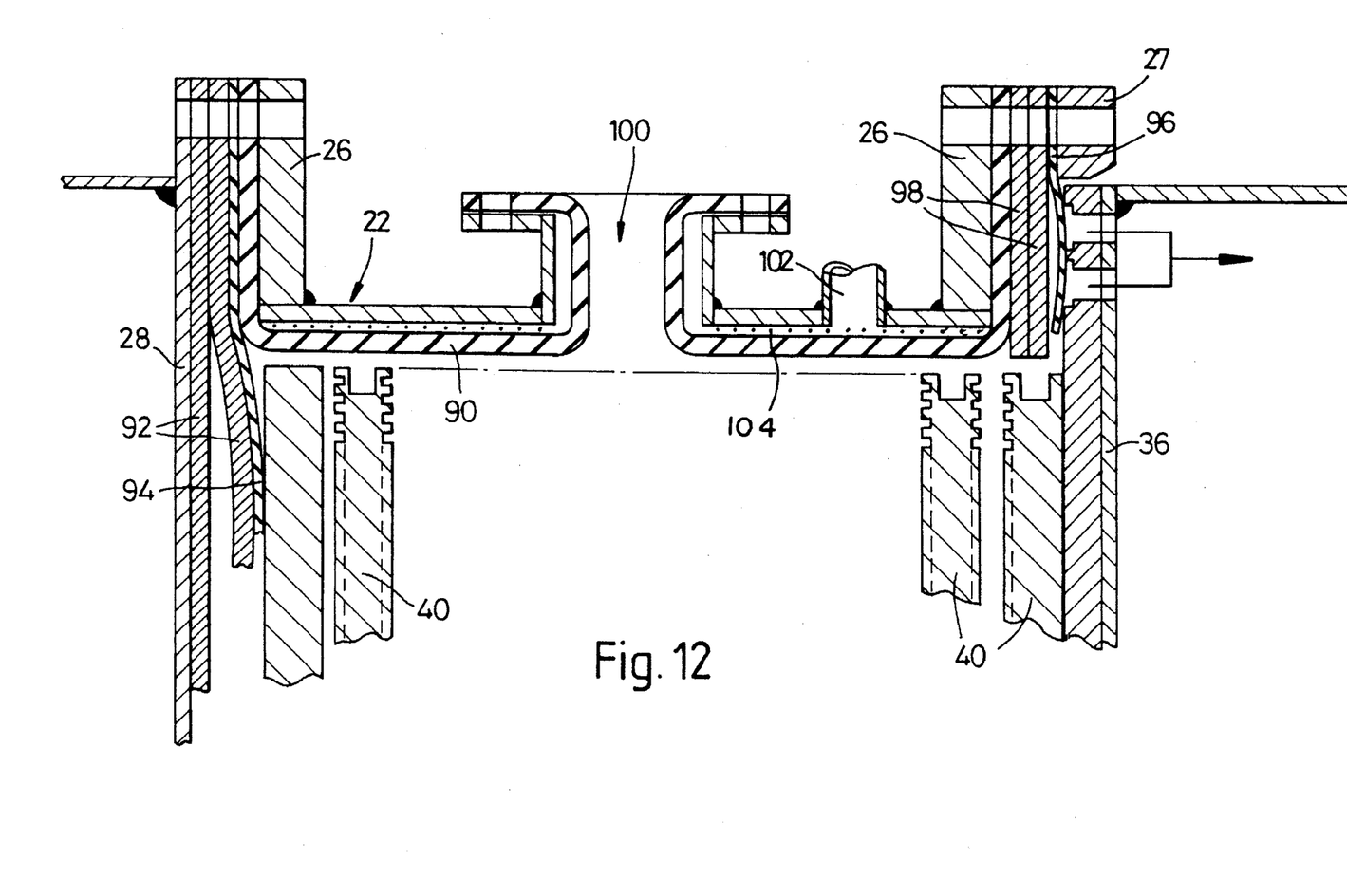
FIG. 12 is a partial longitudinal cross section, to an enlarged scale, showing the plate pack in operative position inside the shell.

The shell 22 is a steel cylinder with radially outwardly turned flanges 26 at each end and closed by a rear end plate 28 at one end, as shown in FIGS. 3 and 12. It is mounted, by way of brackets 30, 31 on a pair of lower rails 32 and a single upper rail 33, the rails being secured to the frame 24, as shown in FIG. 2. It is thereby slidable along the frame 24, under the action of a hydraulically operated toggle link 34, which acts against its end plate 28, so as to engulf and enclose the plate pack 20. In this respect the flange 26 at the open end of the shell 22 is urged into sealing contact with a backing plate 36 of the plate pack 20 with various membranes trapped therebetween, as indicated in FIG. 12 and as will be described further later.

Figure 4:
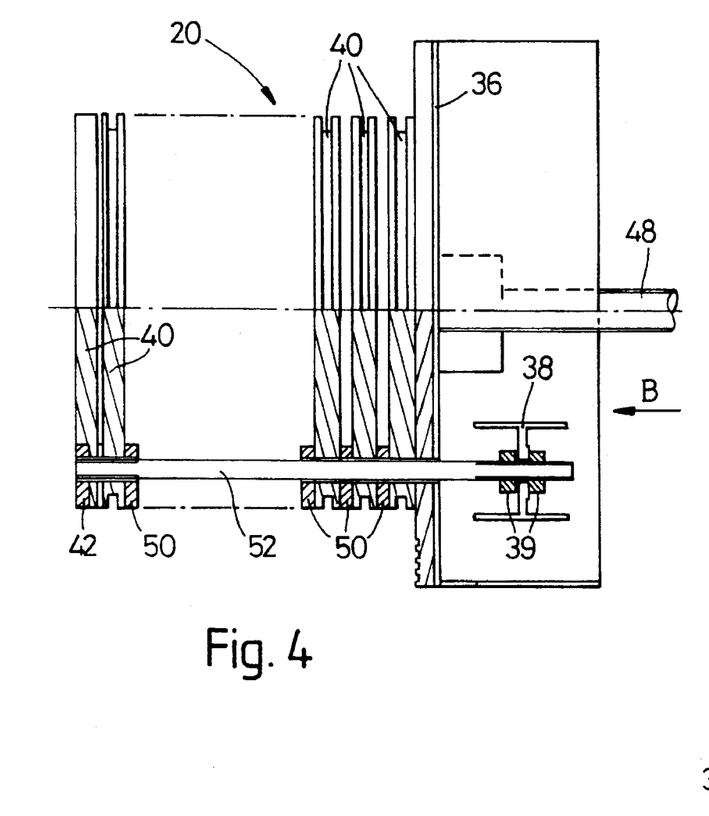
FIG. 4 is an enlarged side view, partially in section, of the plate pack assembly.
Figure 5:
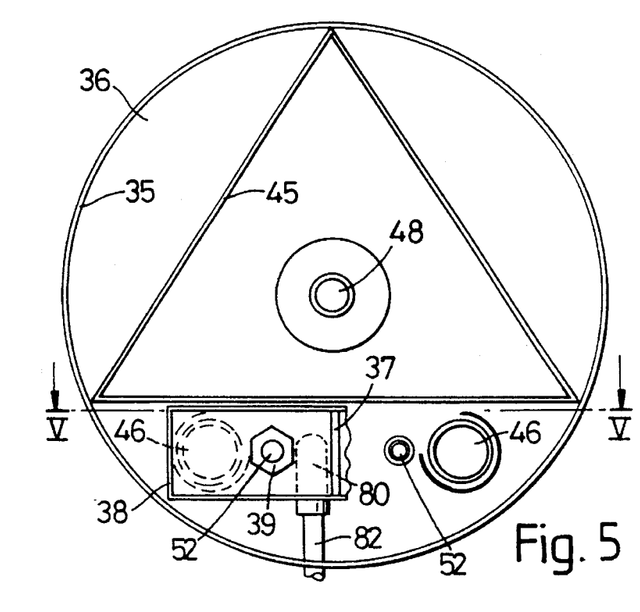
FIG. 5 is an end view in the direction of arrow B in FIG. 4.
Figure 6:
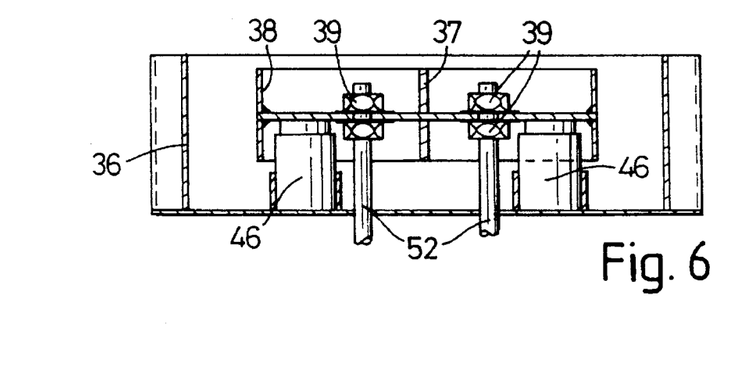
FIG. 6 is a cross section along line V—V in FIG. 5 in the direction shown.

Referring to FIGS. 4 and 5, the plate pack 20 consists of a plurality of filter plates 40, and intervening spacers 50, which are slidably mounted onto a pair of studs 52, which additionally extend through the backing plate 36 to a pulling plate 38, where they are secured by nuts 39. At the end of the pack remote from the backing plate 36, the studs 52 are secured to an end plate 42. It will be noted that the studs 52 are arranged relatively closely side by side in the lower region of the pack. The pulling plate 38 is a short I-beam section with end walls and a central wall 37 for added strength, as shown in FIG. 6. Between the pulling plate 38 and the backing plate 36, two hydraulic cylinders 46 act, which in operation serve to press the plates 40 and the spacers 50 together. As shown in FIG. 5, the outer surface of the backing plate 36 is provided with an upstanding rim 35 and triangular configuration cross walls 45, again for added strength. Also, the backing plate 36 is connected to the frame 24 via a central shaft 48, whereby rotation of the plate pack 20 is permitted, as will be described later.

Figure 7:
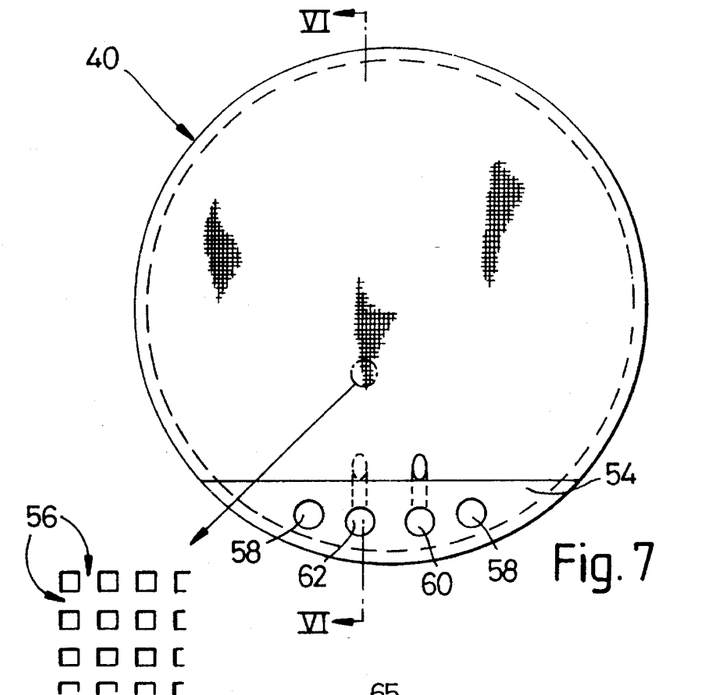
FIG. 7 is a front view of a single filter plate.
Figure 8:
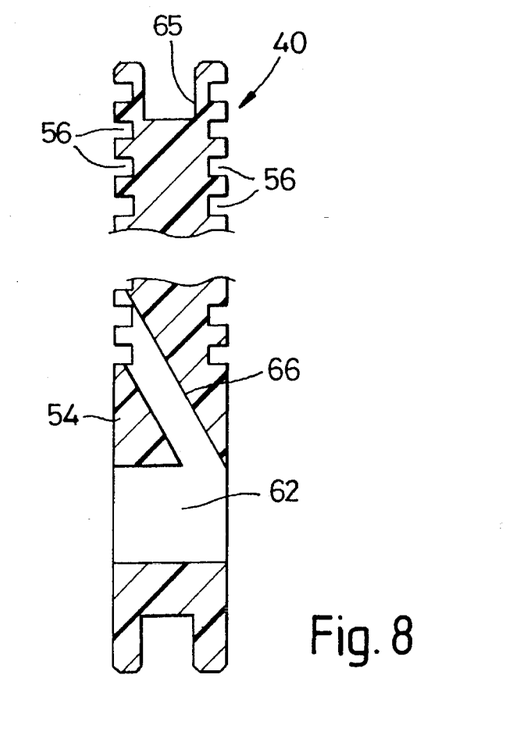
FIG. 8 is an enlarged fragmentary cross-section along line VI—VI in FIG. 7 in the direction shown.
Figure 9:
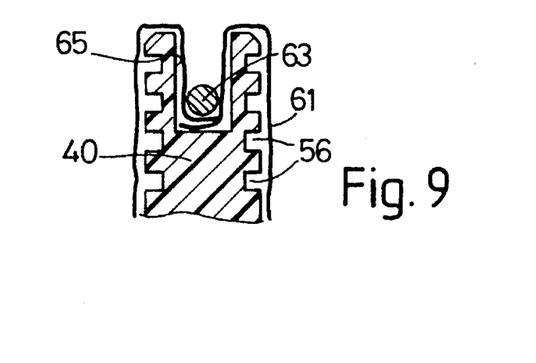
FIG. 9 is a partial view, in section, of an edge region of a filter plate, illustrating how an overlying filter cloth may be fixed.

Turning now to FIGS. 7 and 8 the filter plates 40 may be polypropylene discs with horizontal and vertical intersecting grooves 55 on their respective major surfaces, as shown in the expanded detail from FIG. 7. These grooves 56 terminate a snort distance above the lower extremity of each plate face, typically 60–100 mm above the lower edge where a segment 54 is provided with apertures 58 for the studs 52 as well as with two drainage channel portions 60, 52, which link with those in the adjoining spacers 50 and plates 40. The drainage channel portions 60, 62 are located between the two stud apertures 58. The grooves 56 in one surface drain via an oblique connecting duct 64 to one said channel 60, while the grooves 56 on the other surface drain via a corresponding duct 66 inclined in the opposite direction to the other said channel 62. Filter cloth 61 will be clamped around each plate by means of C clip or wire 63 or the like locating into a peripheral groove 65 in each plate 40, as shown in FIG. 9.

Alternatively, as filter medium, ceramic or sintered plastics filter plates may be used, which would not require coverage by filter cloth in view of the microporous nature of such materials.

Figure 10:
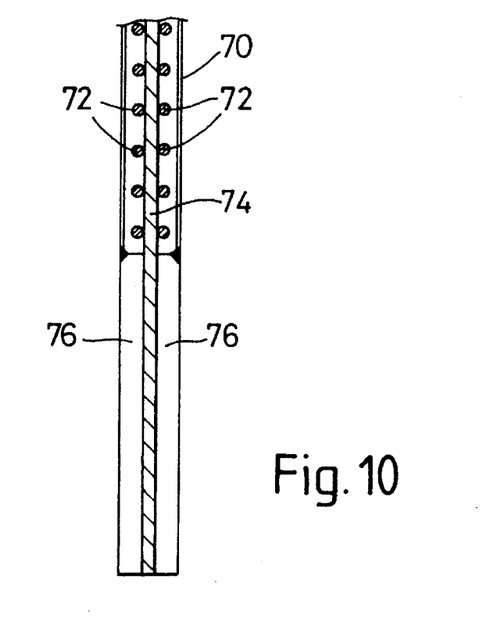
FIG. 10 is a partial cross section of an alternative form of filter plate.

The preferred style of plate would consist of satin smooth sintered steel 70 overlying on a wire mesh drainage grid 72, the lower region of such a plate being shown in FIG. 10. The illustrated plate includes a central support plate 74 of any suitable material, such as a metal, having apertures (not shown) in its lower segment for the location of the studs 52 and as portions of the drainage channels 60, 62, as in the embodiment of FIG. 7. The wire mesh 72 is welded, or otherwise fixed, to both major surfaces of this support plate 74 so as to provide drainage channels, comparable to the intersecting grooves 56 of FIG. 7. In the lower segment additional solid plates 76 are attached to each side of the support plate 74, to the height of the sintered steel skin 70, and there again have aligned apertures (not shown) for the studs 52 and in drainage channel portions 60, 62. The sintered steel skin 70 is welded at intervals to the mesh 72 and around the periphery to the edge of the support plate 74 and to the additional plates 76. To achieve the same pattern of drainage as in the above-described embodiment, i.e. from one side to one channel 60 and from the other side to the other channel 62, one of the apertures 60 in one of the additional plates 76 is in the form of an elongate slot communicating with the space defined around the mesh 72 at one side, while The other of the apertures 62 is thus formed in the additional plate 76 at the other side of the support plate 74. As the spacers 50 extend above the join between the additional plates 76 and the sintered steel skin 70, no suspension can enter the aforesaid slots, and the channels 60, 62 without first being filtered.

At the backing plate 36 the drainage channels 60, 62 (constituted by all the adjacent portions thereof) terminate in elbows 80 and flexible hoses 82, as indicated in FIGS. 1 and 5, to conduct the filtrate away.

Figure 11:
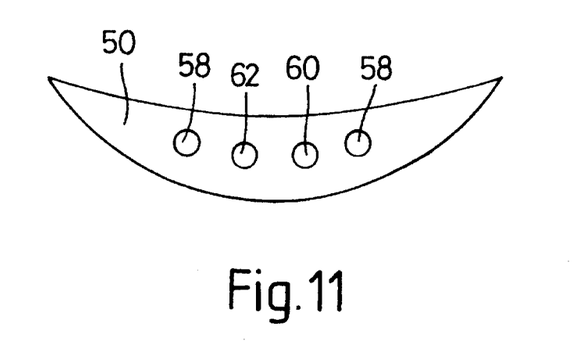
FIG. 11 is a front view of a single spacer.

The spacers 50 are made of elastomeric material, preferably rubber of approximately 30% compressibility. They are advantageously crescent-shaped, as shown in FIG. 11, so as to facilitate discharge of cake, as will be explained later.

Figure 13:
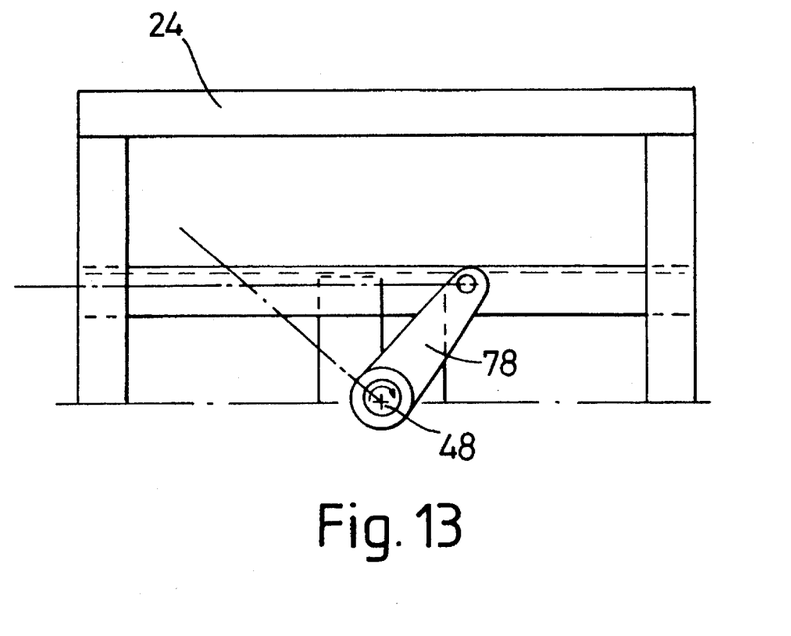
FIG. 13 is a simplified end view of the apparatus of FIG. 1 (omitting the plate pack and shell) in a direction opposite to arrow A, showing the mechanism for rotation of the plate pack.

The entire plate pack 20 is rotatable about the axis of the central shaft 48 through an angle of 90°. In this respect, the central shaft 48 is journalled in the frame 24 and attached to a lever 78, the other end of which is movable to and fro under the action of a hydraulic piston and cylinder arrangement (not shown) which is also mounted on the frame 24. This is shown in FIGS. 1 and 13.

Figure 14:
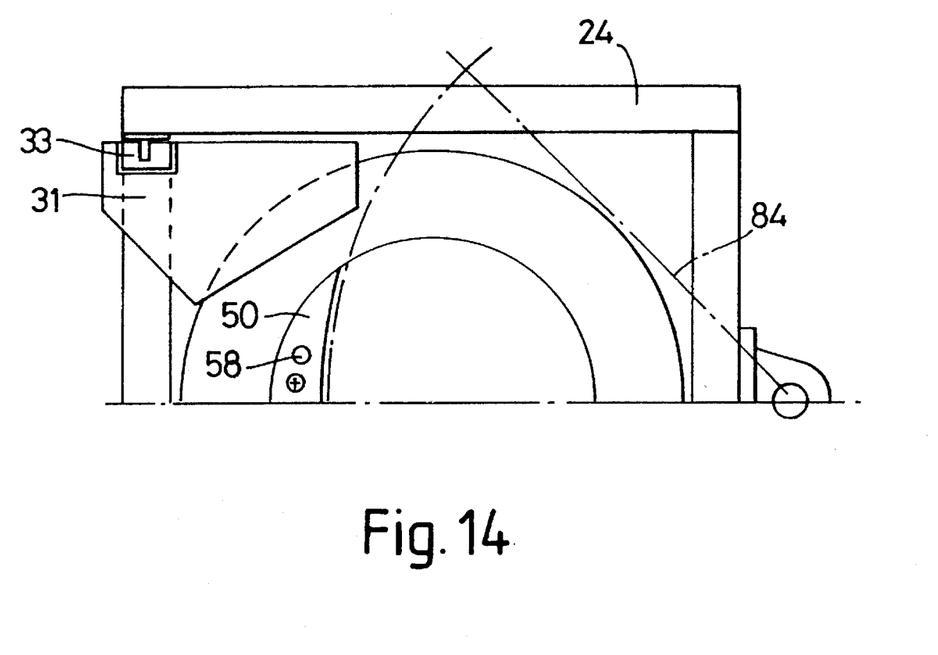
FIG. 14 is a schematic view of the upper half of the apparatus, part way along the plate pack, and with the latter rotated to the position for cake discharge, showing a rake for assisting said discharge.

The spacers 50 are located in approximate overlying relation to the non-grooved lower segments of the filter plates 40 when the filtration operation is taking place. In this respect the spacers 50 also have two apertures 58 which the studs 52 extend through and two apertures 60, 62 which constitute portions of the respective drainage channels. When filtration is finished and the shell 22 moved away from the plate pack 20, or even before that takes place, the plate pack 20 is rotated through 90° so that the spacers 50 are located at one side. Discharge of the cake, much of which may occur by cake simply dropping down from between the adjacent plates 40, is therefore not impeded by the spacers 50. To facilitate cake discharge a rake 84 may be provided, pivotally mounted on the frame 24 and having respective tines which are swingable between the respective adjacent plates 40. This is indicated schematically in FIG. 14. in this respect, the rake 84 is mounted on the frame 24 at the side thereof opposite to that to which the spacers 50 are moved and the length of the tines is matched to the inner radius of the crescent shaped spacers 50, i.e. to be slightly shorter then said radius, so once again the spacers 50 do not impede cake discharge.

Referring now to FIG. 12, there is, inside the shell 22 a liner of flexible, substantially impermeable sheet material. This liner 90 is of generally tubular form and it is clamped at one end between the outturned flange 26 of the shell 22 and the end plate 28 that closes the shell and at the other end by the respective outturned flange 26 of the shell and a flange ring 27. At the said one end of the shell, there is a further inflatable bag 92 of flexible substantially impermeable sheet material mounted by annular clamping around its periphery between the respective shell flange 26 and end plate, 28 outwardly of the main liner 90. This bag 92 is optional. Additionally further chemically inert membranes 94, 96 may be provided at both ends, clamped between the liner 90 and the end plate 28 at one end and the flange ring 27 at the other. Also at the open end of the shell, additional annular sealing membranes 98 may be provided whereby a tight seal can be achieved between the backing plate 36 of the plate pack 20 and the outturned flange 26 of the shell 22 at that end.

The liner 90 extends through a main feed inlet 100 of the shell 22, i.e. the port to be used for entry of medium to be filtered which may be e.g. 5 cm in diameter. A further inlet port 102 for water and vacuum, which may e.g. 2.5 cm in diameter, is provided in the shell 22 and this does not traverse the liner 90, but only communicates with the space between the liner 90 and the shell 22 to effect inflation and evacuation of same. Within the aforesaid space, effectively overlying the entire inner surface of the shell 22 as well as the mouth of the port 102, there is a wire mesh 104. This is necessary to ensure quick and reliable evacuation of the aforesaid space via the port 102, i.e. to preclude any adhesion of the liner 90 to the shell, or blockage of the port 102 by the liner 90 at the time of evacuation.

Separate inlet ports (not shown) are advantageously provided to communicate with the interiors of the additional bag 92 and with the sealing membranes 98 (in cases where the latter are joined at their edges to provide an inflatable annular envelope) so that pressure media different to that supplied to the space around the liner 90 can be supplied thereto, and/or different (usually higher) pressures can be attained which may enhance the filtration/sealing efficiency.

The basic operation of the apparatus will by now be readily apparent to those skilled in the art. The toggle arm 34 is firstly actuated to slide the shell 22 along the frame 24 until it fully encloses the plate pack 20 and the sealing membranes 90, 98, 96 are urged into tight abutment against the backing plate 36 so that there is no possibility of leakage of liquid from within. At this point the sealing membranes 98 may be inflated by compressed air or water to form a secure seal.

The shell liner 90 is then pressurised by water entering via the auxiliary inlet port 102 of the shell, to a pressure of approximately 0.5 bar, for example. This fills up the space within the shell 22 surrounding the plate pack 20 and provides a non-compressible tight fitting surface for subsequent filtration under pressure. The pressure bag 92 is also inflated, preferably by entry of compressed air or liquid through a separate inlet, as mentioned above. The two hydraulic cylinders 46 acting upon the backing plate 36 of the plate pack 20 are then actuated to exert load on the studs 52 and press the plates 40 and spacers 50 together, thereby compressing the latter to a predetermined degree.

Medium to be filtered, generally in the form of slurry, is then fed in under pressure, via port 100 to the central chamber bounded by the liner 90 and the pressure bag 92 and filtration via the filter cloth (if present), the grooves 56 and the drainage channels 60, 62 takes place in the normal manner until a more or less dry care is formed upon the surface of the cloth, or the plates, and substantially all the filtrate has drained away. A vacuum pump may be attached to the hoses 82 leading from the drainage channels 60, 62 to assist filtration.

If cake compression is required the additional pressure bag 92 can be inflated to whatever pressure is required, squeezing the entire plate pack 20. The hydraulic cylinders 46, now operating at increased pressure, will take up any slack which might otherwise occur.

For cake washing, when required, wash liquor (generally water) is forced in reverse direction through one of the two drainage channels 60, 62 and must pass out of the grooves 56 in one surface of each plate 40, through the adjacent cake and into the facing grooves of the adjacent plate 40 before draining out through the other drainage channel 60, 62. This ensures even washing and also a degree of cloth or plate washing.

After filtration, and any required washing, the liner 90 is voided by a vacuum pump connected to the auxiliary inlet port, 102 and the pressure bag 92 and the inflatable seal 98 are similarly voided through their respective inlet ports.

The entire plate pack 20 may then be rotated through 90° by operation of the lever 78, as previously described, so as to move the spacers 50 out of the way of cake discharge before the shell 22 is slid away to uncover the pack 20. Alternatively, the shell 22 may be withdrawn first, then the plate pack 20 rotated. The hydraulic cylinders 46 are then released and the spacers 50 expand again so that the cake hitherto pressed between the plates 40 is mostly freed and drops down. As mentioned a rake 84 can be fitted to push any residual cake out from between the plates 40.

The above described apparatus, and minor variants thereof, has numerous advantages over the traditional filter presses described in the introduction hereto. Most importantly, the apparatus exemplified above is designed to operate in the high efficiency range of cake thickness, e.g. 6 mm at each side of each plate making a total of 12 mm between adjacent plates (which is half that usually obtained with traditional filter presses), because it can rely on fast cycles. It is calculated that each cycle is likely to take less than ten minutes. This offers the user a greater degree of continuity and less need to have large and expensive cake and feed holding capacity.

Cake dryness and washing efficiency should be at least as good as that of any known filter or membrane presses. It will be appreciated, of course, that the described apparatus is totally enclosed and the shell hermetically sealed over the plate pack during all filter and wash operations.

Cake discharge is fully automatic in the above described machine. If so required, (e.g. for cake discharge which may present a health or environmental hazard) the entire filter can be enclosed by simply sheeting around the frame.

Based on average filtration curves the exemplary apparatus described above will require between one half and one third the number of plates which an equivalent conventional filter press needs to achieve the same rate of throughput. Overall, as the construction is essentially simple and given the much smaller number of plates, the equipment is smaller and lighter than equivalent filter presses as well as being economically attractive in the respects enumerated above. Indeed it is likely that the inventive apparatus can be operated at much lower pressures than one would expect with filter presses and thus save considerable sums in not having to provide high pressure slurry pumps.

It will be understood, of course, that the invention is not limited to the described details of the illustrated embodiment and variations in detail of construction and operation are possible within the scope of the appended claims.

What we claim is:

1. A filter press apparatus for filtering a slurry comprising:

a substantially rigid outer shell with opposed ends and defining a central axis extending between said opposed ends;

an assembly including a plurality of substantially parallel disc-shaped filter plates, each said filter plate including a pair of opposed faces and a peripheral edge, a filter medium on each said opposed face for filtering the slurry, wherein said filter medium includes an upstream portion for receiving the slurry to be filtered and a downstream portion for filtrate discharge, wherein the filter plates are arranged in face-to-face relation and configured and arranged such that said peripheral edges coaxially surround said central axis and said opposed faces extend perpendicularly with respect to said central axis, means for selectively locating said assembly within said shell to provide a closed vessel, and outlet means for directing filtrate from the downstream portion of each filter medium to an exterior of said closed vessel;

means for moving either one of said assembly and said shell relative to the other between a first position wherein said assembly is sealed within said shell and a second position wherein said assembly is at least partially removed from said shell;

first inlet means in said shell for directing slurry to be filtered to the upstream portion of the filter mediums positioned on the opposed faces of said filter plates;

means for providing a pressurized supply of slurry to be filtered to said shell, via said first inlet means when said assembly and said shell are disposed in said first position;

a generally tubular and substantially impermeable flexible membrane lining in said shell extending between said opposed ends coaxially surrounding the peripheral edges of said filter plates in said first position, a space defined between said lining and said shell, second inlet means in said shell communicating with said space for introduction of a pressure medium to said space for selective inflation of said membrane into contact with the peripheral edges of said plates in said first position and during filtration of the medium to be filtered.

2. Apparatus as set forth in claim 1 including a support frame, means for mounting said filter plate assembly on said support frame and means for mounting said shell on said support frame, said means for mounting said shell including said means for moving.

3. Apparatus as set forth in claim 1 wherein said assembly includes spacers of elastomeric material mounted between and spacing adjacent filter plates of said assembly.

4. Apparatus as set forth in claim 3 including means for mounting said filter plates and said spacers for sliding movement laterally toward and away from each other, and mechanical means for releasably pressing the plates and the spacers together.

5. Apparatus as set forth in claim 4 including an inflatable bag composed of substantially impermeable, flexible material, means for mounting said bag within said shell at one of said ends for selective inflation into engagement between said one of said ends and said assembly when said assembly is in said shell for additional compression of said plates and spacers.

6. Apparatus as set forth in claim 3 wherein said spacers are of a partially circular configuration.

7. Apparatus as set forth in claim 3 wherein the peripheral edges of said filter plates include outer peripheries, each of said spacers generally conforming to and only partially extending around the periphery of each of said filter plates adjacent thereto.

8. Apparatus as set forth in claim 7 including means for rotating said assembly of filter plates relative to said shell and around the axis defined by said plates.

9. Apparatus as set forth in claim 8 wherein said assembly of filter plates is rotatable at least through an angle of substantially 90°.

10. Apparatus as set forth in claim 1 wherein said outlet means comprises communicating draining grooves defined in each said opposed face and intersecting in a crossing pattern, first channel means defined along said assembly, means for communicating said first channel means with the draining grooves in each of one of said opposed faces of a respective said filter plate for receiving drainage therefrom, and second channel means defined along said assembly, and means for communicating said second channel means with the draining grooves in each of the other of said opposed faces of a respective said filter plate for receiving drainage therefrom.

* * * * *